United States Patent [19]
Klingman

[11] Patent Number: 5,860,021
[45] Date of Patent: Jan. 12, 1999

[54] SINGLE CHIP MICROCONTROLLER HAVING DOWN-LOADABLE MEMORY ORGANIZATION SUPPORTING "SHADOW" PERSONALITY, OPTIMIZED FOR BI-DIRECTIONAL DATA TRANSFERS OVER A COMMUNICATION CHANNEL

[76] Inventor: Edwin E. Klingman, 3000 Hwy. 84, San Gregorio, Calif. 94074

[21] Appl. No.: 846,118

[22] Filed: Apr. 24, 1997

[51] Int. Cl.[6] .................................................. G06F 15/76
[52] U.S. Cl. .................................... 395/800.32; 395/200.8
[58] Field of Search ...................... 395/800.01, 800.32, 395/200.43, 200.08, 200.5, 828, 309; 711/100, 131, 147, 139; 370/254, 351, 401, 402

[56] References Cited

U.S. PATENT DOCUMENTS

| | | | |
|---|---|---|---|
| 4,604,683 | 8/1986 | Russ et al. .............................. | 395/280 |
| 5,497,373 | 3/1996 | Hulen et al. ............................ | 370/259 |
| 5,530,894 | 6/1996 | Farrell et al. ........................ | 395/200.8 |
| 5,537,654 | 7/1996 | Bedingfield et al. ................... | 395/837 |
| 5,574,861 | 11/1996 | Lorrig et al. ......................... | 395/200.56 |
| 5,682,552 | 10/1997 | Kuboki et al. .......................... | 395/872 |

*Primary Examiner*—Alpesh M. Shah
*Attorney, Agent, or Firm*—Claude A. S. Hamrick; Oppenheimer w Donnelly Maryam Imam

[57] ABSTRACT

A microcontroller down-loadable memory organization supporting "shadow" personality, optimized for connecting a computer system to an ISDN network to facilitate transmitting and receiving of data, the microcontroller including a processor and a memory structure having ROM memory space for storing program code therein and further including a dual port RAM for connection between the computer and the processor, the dual port RAM having RAM memory space for storing program code therein and shared RAM for storing data capable of being simultaneously accessible by the processor and the computer, wherein the program ROM and the program RAM are selectively used by the computer to store program code by the computer using a ROM/RAM* select signal, and wherein the starting address in the shared RAM wherein data is stored is selectably offset from the starting address of the code RAM and the code ROM.

17 Claims, 7 Drawing Sheets

5,860,021

SINGLE CHIP MICROCONTROLLER HAVING DOWN-LOADABLE MEMORY ORGANIZATION SUPPORTING "SHADOW" PERSONALITY, OPTIMIZED FOR BI-DIRECTIONAL DATA TRANSFERS OVER A COMMUNICATION CHANNEL

BACKGROUND OF THE INVENTION

1. Field of the Invention

The present invention relates generally to apparatus for facilitating communication over the Integrated Services Digital Network (ISDN), and more particularly to an improved single chip microcontroller device for use in a transceiver system adapted to communicate data from a host computer through an Integrated Services Digital Network to a destination computer. A semiconductor microcontroller located within the transceiver and coupled between the host computer and an ISDN interface includes software code, a processor and memory architecture integrated within the controller for selectably using a "shadow" personality in the memory architecture to support the software code while allowing simultaneous accessing of the memory by the computer and the processor.

2. Description of the Prior Art

In the past decade, due to many technological breakthroughs, computers have gained phenomenal popularity among users ranging across a wide spectrum of industries and personal users. This popularity has contributed to technological advancements in the efficient linking together of computers, including those located in remote areas, so that information such as digital data and voice can be transferred between computers. Furthermore, the advent of digital telephone has changed both the engineering and economic aspects of data communications. Specifically, many hardware requirements are now met with reliable and low cost digital integrated circuits (ICs). The ability to link computers through a communication medium coupled with the usage of digital telephones has lead to various communications network interconnections wherein data terminal equipment (DTE) can communicate through an Integrated Services Digital Network (ISDN). A detailed description of such a system is disclosed in U.S. Pat. No. 5,541,930 entitled "Byte Aligned Communications System For Transferring Data From One Memory To Another Memory Over An ISDN," issued to Edwin E. Klingman (hereinafter referred to as the "'930 Patent").

In FIG. 1 of the drawing, a simplified block diagram of a prior art communications system 10 is shown employing an ISDN network 12 for communicating data or voice between transceivers 14 and 16 (or between the transceivers 14 or 16 and another ISDN compatible system 17) wherein each transceiver includes a computer 18, 20 and an interface circuit 22, 24, respectively. Data and/or voice signals may be exchanged between the transceivers and/or other systems through the ISDN network 12. As further disclosed in the '930 Patent, a single transceiver can be used to communicate with any ISDN-compatible system. Within each transceiver, the included computer is capable of generating and receiving data. In the receiving mode, the interface circuits 22, 24 receive ISDN frames, having data incorporated therein, from the ISDN network 12 through communication channels 30 and 32, respectively, extract the data and transfer the extracted data to the corresponding computer 18, 20. In transmitting data, each computer 18, 20 sends data bytes through a bus 26, 28 to the corresponding interface circuit 22, 24 which in turn sends the data to the ISDN.

FIG. 2 illustrates a more detailed block diagram of the interface circuits 22 and 24 (as described in the '930 Patent) as may be employed in the system of FIG. 1. As depicted, interface circuit 22 is coupled to a computer 18 through a bus line 26 and is further coupled to an ISDN network 12 through a communication channel 30.

The ISDN network 12 includes three channels, namely the channel 34 and the B2 channel 36 (collectively referred to as the B-channels 30) and the D channel 38. B-channels 30 generally carry data bytes in 48-bit ISDN frames (for further discussion of ISDN frames, refer to the '930 Patent) and the D-channel generally carries information in 4-bit frames. As suggested at 42, the computer 18 includes driver code implementing ISDN protocol for coupling the computer 18 with the interface circuit 22.

Within the prior art interface circuit various ICs are included and are described in greater detail in the '930 Patent. Briefly, the interface circuit 22 includes a microcontroller 44, which is an IC, such as the Cy123 ISDN controller manufactured by Cybernetics Microsystems of San Gregorio, Calif., for communicating with ISDN 12 through an integrated subscriber access controller (ISAC) IC 52 such as the Siemens 2085. Initial communication occurs over the D-channel 38 of the ISDN 12 to setup and terminate connections established between transceivers through the B-channels 30. The micro-controller 44 also communicates with a host processor (not shown) such as an Intel Pentium processor, included within the computer 18, in a Microsoft Windows environment. Communication with the host processor is managed through a dual-port RAM 46 (which may comprise one or more ICs residing external to the microcontroller 44) with bi-directional interrupt facilities 48 included therein. The Cy123 chip is based on the Intel 8051 controller architecture which is well known to those skilled in the art. This controller has a Harvard architecture, which separates code and data memory spaces. Within microcontroller 44 is code ROM 50 for storing program firmware (or code) which when executed by the micro-controller, allows transfer of data between the computer 18 and ISDN 12.

While the use of discrete general-purpose components such as micro-controllers like the Cy123, dual port RAMs and subscriber access controllers, allows implementation of ISDN terminal adapters as described in the 1930 Patent, the use of these general-purpose components imposes both cost constraints and functional constraints upon the design of the communications system. This is in large part due to the fixed architecture and inflexible nature of these general-purpose components. For example, code ROM 50 in FIG. 2 stores program code that is not readily alterable and if there are any problems with the code residing therein, (these problems being commonly referred to as "bugs"), the micro-controller device may need to be entirely replaced. Furthermore, since data generally resides in shared RAM 46, accesses of such data by the micro-controller 44 entail additional time due to the shared RAM 46 being resident external to the microcontroller and embodied in a separate IC. Moreover, when program code is stored in ROM, such as in the illustrated system, system functionality can not be redefined. That is, additional features added to the ISDN network may not be readily supported by the existing program code stored in the ROM.

Furthermore, the architecture of prior art interface circuits of the type illustrated in FIG. 2 typically employ a 3-chip solution at a minimum with at least two ICs (46 and 52) including RAM memory space necessary for the storage of data, and a micro-controller which itself includes ROM memory space for storing its program code. The cost of manufacturing electronic products is in large part driven by (1) the number of components resident within the electronic product and (2) the "real-estate" each component occupies. These two criterion determine the size of the product, for example, the more components employed in an electronic device, the higher the cost of manufacturing such product. Therefore, the use of multiple ICs, as well as the fact that each IC occupies substantial real estate on the card or board on which it resides (this area of real estate is oftentimes referred to as the "footprint"), increase the expense of manufacturing. On the other hand, the use of less components on a card allows for smaller designs and lower costs.

For the foregoing reasons, there is a need for an improved microcontroller that enables the design of a more cost-effective interface for connecting a host computer system to ISDN network systems while at the same time providing a means with the flexibility to accommodate feature changes relating in either the ISDN network or in various host computers. There is also a further need for an improved microcontroller which permits modifications to its internal program code to correct problems associated therewith.

SUMMARY OF THE INVENTION

It is therefore a principal object of the present invention to provide an improved microcontroller for facilitating the interfacing of a computer to an ISDN network.

It is a further object of the present invention to provide an improved microcontroller having less electronic components and smaller size for use in interfacing a host computer to an ISDN networking system.

A still further object of the present invention is to provide an improved microcontroller device for use in a communications transceiver used to communicate from one computer to another, the device including a semiconductor controller device having a programmable memory structure organized to allow modification of its internal program code.

Another object of the present invention is to provide a microprocessor of the type described herein having a dual port RAM simultaneously accessible by both the microprocessor and the computer.

Briefly, a preferred embodiment of the present invention includes a microcontroller chip for connection between a computer system and an ISDN network for facilitating the transmission and receipt of data to and from the computer system and the ISDN, the controller chip including a processor and a memory structure having ROM memory space for storing program code therein, and further including a dual port RAM for connection to the computer. The processor has RAM memory space for storing program code therein. The dual port RAM has shared RAM for storing data capable of being simultaneously accessible by the processor and the computer. The program ROM and the program RAM are selectably used by the computer to store program code, the selection being made using a ROM/RAM* select signal and the starting address of the shared RAM wherein data stored is selectably offset from the starting address of the code RAM and the code ROM.

An advantage of the present invention is that it reduces the cost of otherwise expensive electronic circuitry used to interface a source computer to a communications network.

A further advantage of the present invention is that it enables the design of a microcontroller for use in a communications transceiver useful in communicating from one computer to another computer over the ISDN, the improvement being achieved by combining the logic designs of two or more ICs into a single IC, thereby providing a smaller and less costly hardware design solution having software flexibility relative to the selective modification of program code stored therewithin.

These and other objects and advantages of the present invention will no doubt become apparent to those skilled in the art after having read the following detailed description of the preferred embodiments illustrated in the several figures of the drawing.

IN THE DRAWING

DETAILED DESCRIPTION OF THE PREFERRED EMBODIMENTS

Figure 1:
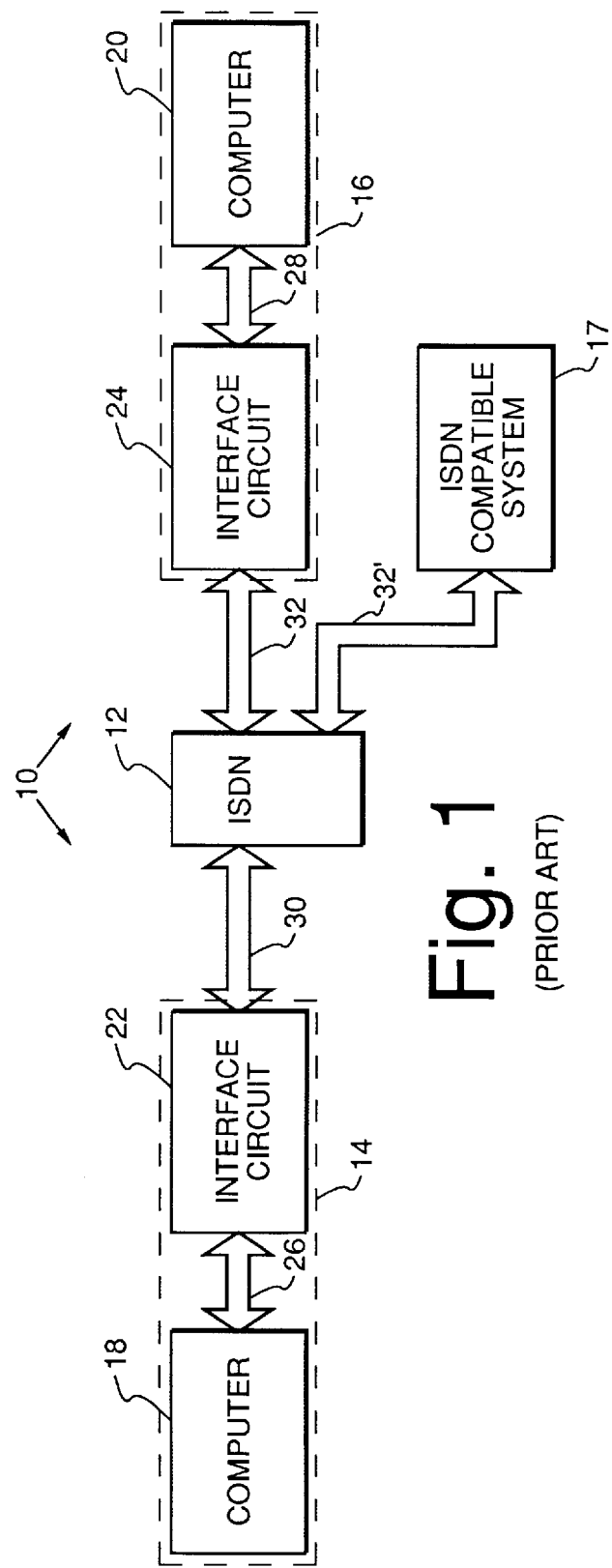
FIG. 1 illustrates a prior art system for communication between two prior art transceivers through an ISDN network.
Figure 2:
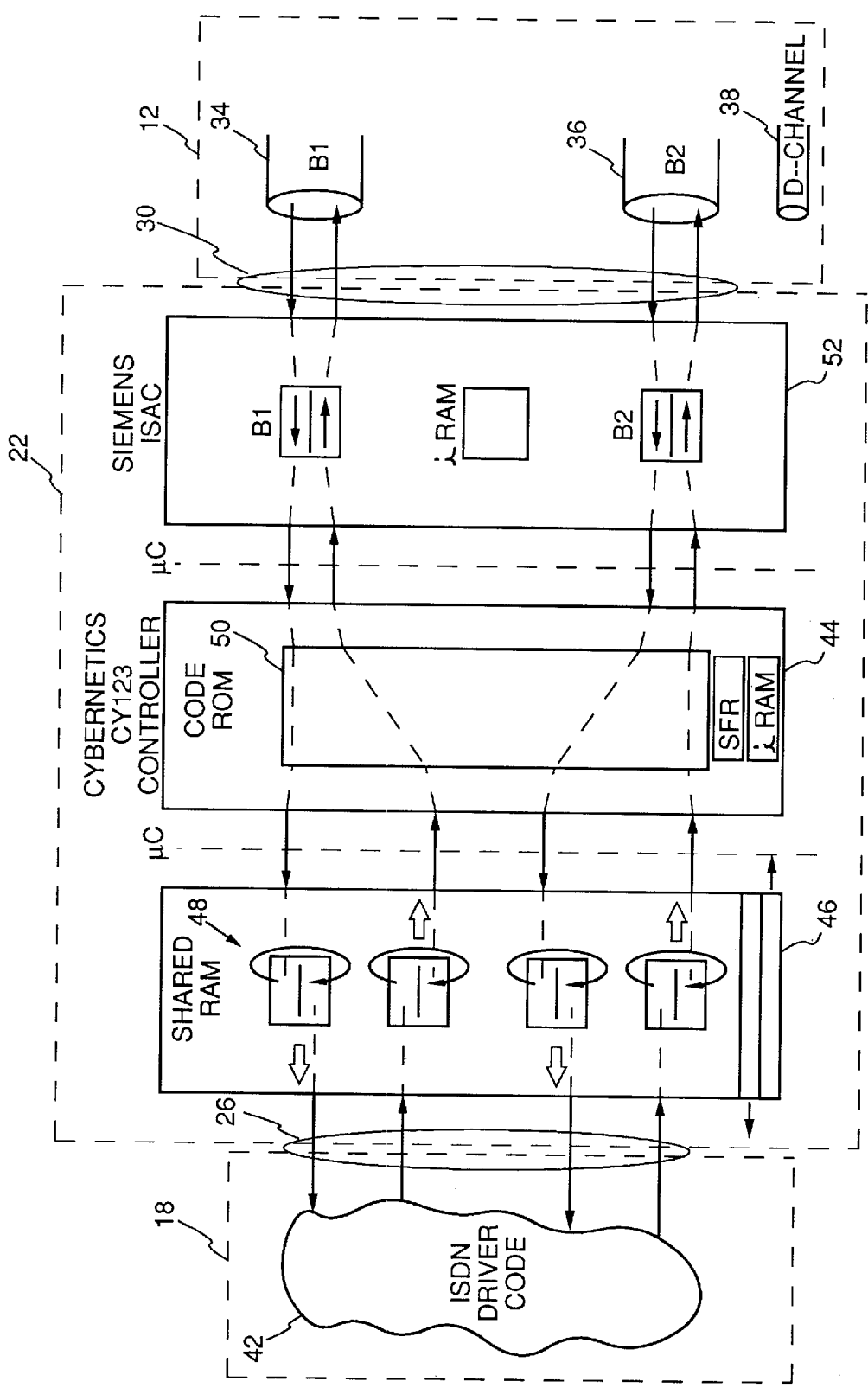
FIG. 2 shows a block diagram of a prior art transceiver.
Figure 3:
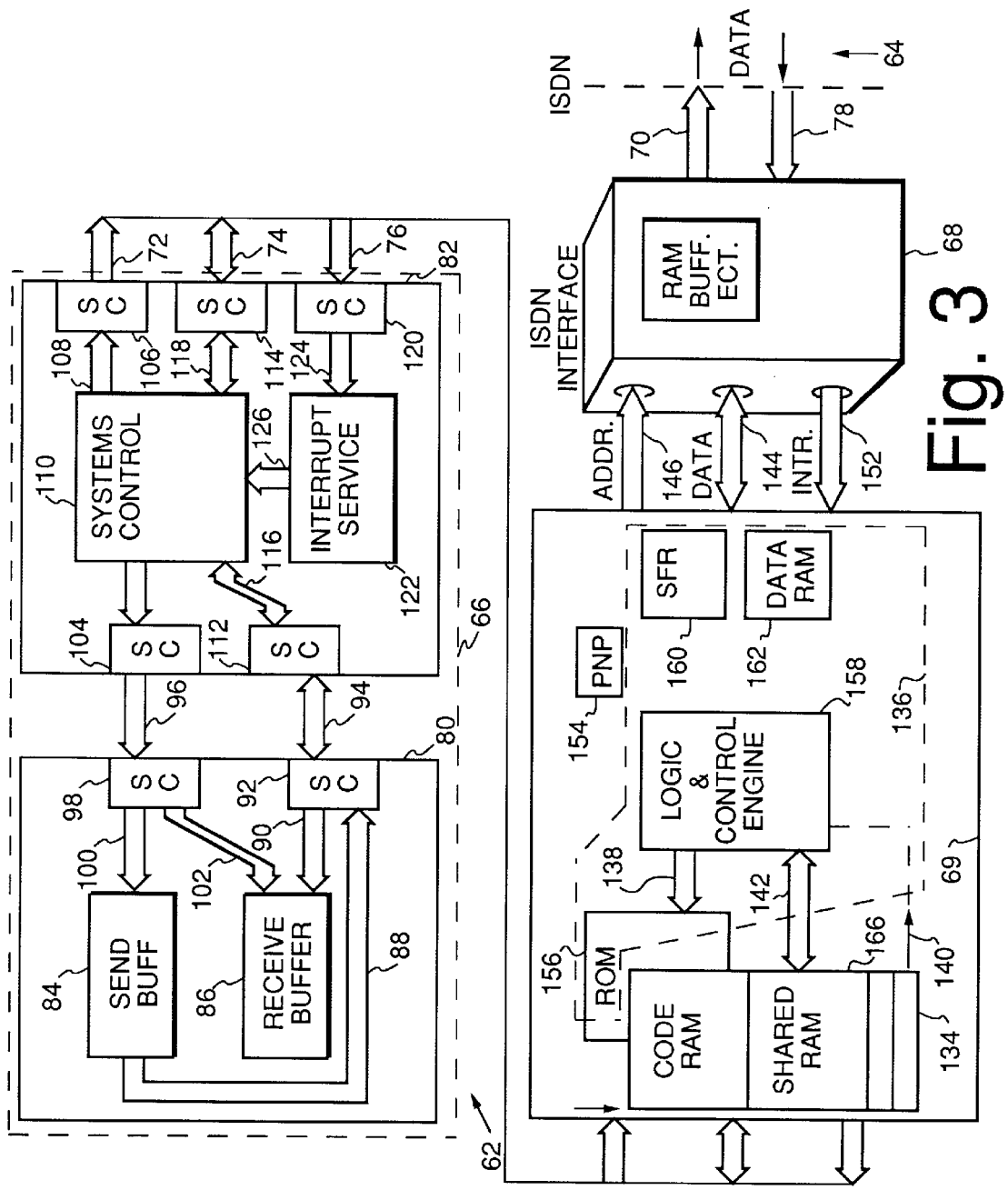
FIG. 3 is a high-level block diagram illustrating a transceiver, including a microcontroller in accordance with a preferred embodiment of the invention.

Referring now the to FIG. 3 of the drawing, there is shown a block diagram of a communications transceiver 62 for communication over an Integrated Services Digital Network (ISDN) at 64, and including a general purpose computer 66 and an ISDN interface circuit 68 coupled together by a microcontroller 69 in accordance with the present invention.

The transceiver 62 is compatible with the current preferred Internet access protocol, synchronous Point-to-Point Protocol (PPP) and has the capacity to handle any new protocol which can be accommodated through conventional computer programming since the circuit allows for flexible firmware programming as will be apparent from the following. In addition, the transceiver 62 can communicate with any other computer that has access to the ISDN. Outgoing data sent to ISDN network 64 through bus 70 originates in the computer 66, and is transferred to the microcontroller 69 by means of address and control bus 72 and data input/output bus 74. The particular address and control signals on bus 72 are selected in response to interrupt signals passed from the interface 68 and through microcontroller 69 to the computer 66 via bus 76. The microcontroller 69 and interface 68 process and format each data byte received from the computer and place it in the B-channel of standard ISDN 48-bit data frames in a similar manner to that taught in the above-referenced '930 Patent, and then transmits the data bytes to the ISDN over bus 70.

Incoming data bytes from the ISDN through bus 78 are embedded in the 48-bit ISDN data frames. The interface 68 extracts the data bytes from the data frame structure under control of microcontroller 69 and, by means of an interrupt signal on bus 76, notifies the computer 66 to receive them, whereupon the computer 66 receives the data bytes by way of address and control signals on bus 72 and data on bus 74.

The computer 66 includes a memory 80 and a central processing unit (CPU) 82. Memory 80 includes a send buffer 84 holding data bytes to be sent via bus line 88, and a receive buffer 86 for receiving data bytes from CPU 82 via bus 90 through support circuit 92. The send and receive buffers 84 and 86 are addressed and controlled by the CPU 82 through bus 96, support circuit 98 and bus lines 100 and 102. The connection to address and control bus 72, data bus 74 and interrupt bus 76 are made to the CPU 82 which responds to interrupt signals to send data to or receive data from the interface circuit 68.

The CPU 82 responds to first interrupt signals via bus 76 indicating that the interface 68 is ready to receive data bytes to be transmitted, by addressing data in the send buffer 84 through bus 96, circuit 98 and bus 100, and by retrieving it via bus 88, circuit 92 and bus 94. The CPU then addresses the interface 68 according to the particular first interrupt signal by way of bus 72, and sends the data through bus 74.

A second interrupt signal on bus 76 notifies the CPU that data bytes from the ISDN are being held and are ready to be received by the computer 66. In response thereto, the CPU addresses the data bytes through bus 72 and receives them through bus 74. The CPU then addresses the receive buffer 86 through bus 96, circuit 98 and bus 102 and sends the data bytes to the buffer 86 via bus 94, circuit 92 and bus 90.

The microcontroller 69 is implemented as a single integrated circuit (IC) that includes a dual port RAM 134 and a dynamically configurable controller 136. The dual port RAM 134 responds to computer address and control signals received through bus 72 and controller address and control signals received through bus 138. RAM 134 generates interrupt signals on buses 76 and 140 and holds data bytes in double buffered transmit and receive buffers in order to timely pass the data bytes from the computer 66 through bus 74 to the configurable controller 136 through bus 142 for outgoing data bytes, or in the reverse order from the configurable controller 136 to the computer 66.

For transmitting data bytes, the dual port RAM 134 responds to a first control signal from controller 136 through bus 138 indicating that there is transmit buffer space available in RAM whereupon RAM 134 sends the first interrupt signal out on bus 76 to notify the computer 66 to send the data. The computer 66, in response to the first interrupt signal, sends addresses and control signals through bus 72 to RAM 134 and loads the data thereto through bus 74. When the RAM is loaded, the computer 66 sends a second control signal to RAM 134 on bus 72, the RAM responding by sending a third interrupt signal out on bus 140 to notify the controller 136 to unload the data via bus 142 from RAM 134 and send it to the ISDN interface 68 via bus 144. When the unloading is complete, controller 136 sends another first control signal through bus 138 and the loading and unloading process is repeated.

For receiving data bytes from the ISDN, the dual port RAM receives address and control signals through bus 138 and corresponding data bytes through bus 142 and loads such bytes into its double buffered receive buffers. When one of the buffers is filled, a third control signal so indicating is received through bus 138 and the dual port RAM responds by outputting a second interrupt signal on bus 76 to notify computer 66 that it should unload data from RAM. The controller 136 fills one buffer in the dual port RAM, and then switches to another, and when it is filled, another third control signal is sent etc., until all the data is transferred to the computer. This operation will be more fully explained below.

The ISDN interface 68 is a standard device generally known to those skilled in the art (for example, a Siemens 2085) and is used without modification. Its function is to receive data bytes through bus 144 in response to address and control signals received via bus 146. In response to the control signals, interface 68 proceeds to place the data bytes in the B-channel of standard ISDN 48-bit frames and sends them out on bus 70 to the ISDN 64 (in FIG. 3). Incoming data frames are received through bus 78, and in response thereto the interface 68 extracts the data bytes, stores them in a first-in/first-out buffer and outputs a fourth interrupt signal on bus 152 to controller 136. The controller then responds to the fourth interrupt signal, stops data transmission and sends appropriate address and control signals through bus 146 to unload the data from interface 68 through bus 144.

The controller 136 responds to interrupt signals received through buses 140 and 152 in order to direct data bytes either from bus 144 to bus 142, or from bus 142 to bus 144. When outgoing data bytes have been loaded to a transmit buffer in RAM 134 by computer 66, the dual RAM responds by putting the third interrupt signals on bus 140, and the controller 136 responds by sending a corresponding address and control signal to bus 138 causing the transfer of the data bytes from RAM 134 to controller 136 via bus 142. The controller then sends address and control signals over bus 146 to the ISDN interface 68 and transfers the data bytes thereto via bus 144. When the transmit buffer in RAM 134 is emptied, controller 136 sends the first control signal to the RAM via bus 138 and switches to unload the alternate buffer in the dual port RAM. RAM 134 responds by sending the first interrupt signal to the computer 66 indicating that a transmit buffer is ready to be loaded. This process is then continued until the data bytes are all transmitted.

When data bytes arrive from the ISDN, the interface 68 applies the fourth interrupt signal to bus 152, and in response the controller puts any transmission of data bytes on hold, sends an address and control signal via bus 146 to interface 68 and transfers the data byte from the interface via bus 144, whereupon an address and control signal is sent via bus 138 to RAM 134, and the data byte is transferred to the receive buffer in the dual port RAM via bus 142. This process is repeated until the receive buffer is loaded. The controller 136 then sends the third control signal to RAM 134 via bus 138, and in response the dual port RAM sends a fourth interrupt signal via bus 76 to the computer to direct it to unload the receive buffer in the RAM. The controller senses the filling of one receive buffer and switches to load a second receive buffer in the RAM, and when the second one is filled, another fourth interrupt signal is sent to the computer 66 to instruct it to unload the second receive buffer. This process is repeated until all of the incoming data is transferred to the computer.

As illustrated, microcontroller 69 is comprised of an integration of the dual port RAM 134 and the controller 136 into a single IC. Microcontroller 69 is additionally shown to include plug-n-play (PnP) circuitry 154 (this circuit being only optional and not a required part of the controller design) for providing compatibility with Microsoft's Windows 95 operating system. Plug-and-play is a scheme by which the host processor (computer 66) can query the addressing subsystems as to the systems resource requirements (memory address space, I/O address space and interrupt address space) and use this information to manage system resources. After all relevant resources have been identified, the host processor informs the plug-and-play circuitry of the base address (or offsets) to be used during the current session (after power-on or hardware reset). For more detailed information regarding plug-and-play, the reader may refer to "Plug and Play System Architecture" by Tom Shanley, Addison Wesley 1995 ISBN 0-201-41013-3.

Market realities strongly recommend that plug-and-play circuitry be added to the communications system to support the Microsoft Windows 95 market. However, since Windows 3.1 and Windows 3.51, and OS/2 operating systems do not support plug-and-play, it is alto desirable to have the capability to disable the plug-and-play circuitry 154. The enabling and disabling option of the preferred embodiment's plug-and-play option is implemented by a simple mode control pin and a gate (not shown) on the microcontroller chip 69.

Due to the integration of the dual port RAM with the configurable controller and the plug-n-play circuitry, the microcontroller 69 provides a lower-cost and smaller-sized device that is (E)ISA bus compatible, Plug-and-Play (PnP) compatible, and when combined with Siemen's ISDN interface as an analog "front end" device, it is compatible with all of the major ISDN switches throughout the world.

Figure 4:
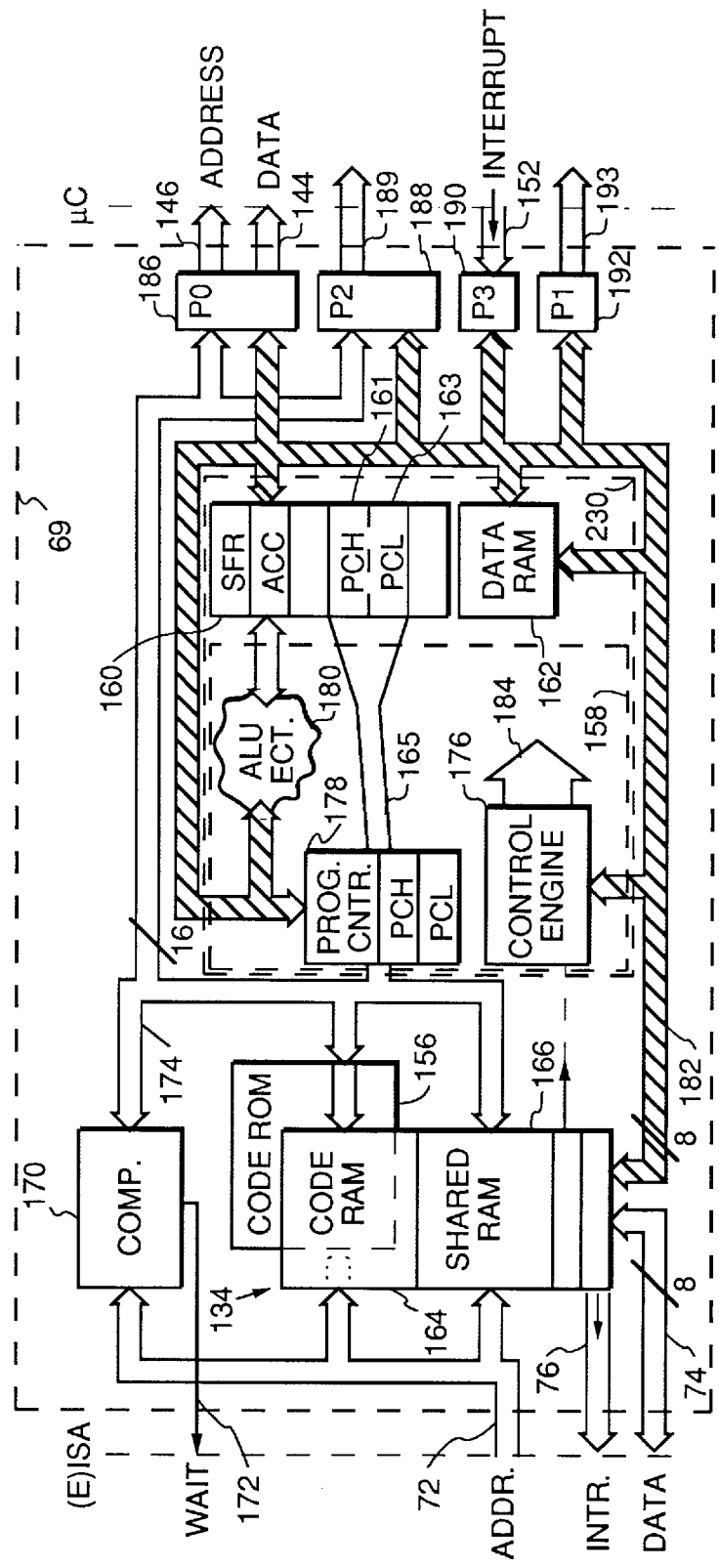
FIG. 4 is a block diagram depicting in more detail the internal components of a microcontroller in accordance with a preferred embodiment of the present invention.

As illustrated, the microcontroller in FIG. 4 further includes code ROM 156, a logic and control engine 158, a special function register 160 and a data RAM 162. Dual port RAM 134 includes two memory spaces, code RAM 164 and shared RAM 166, the address spaces of which are definable within a memory map.

The architecture of a preferred embodiment of the present invention as provided in FIG. 4 is shown in which code ROM 156 memory space is overlaid by the code RAM 164 memory space which is in turn contiguous with shared RAM 166 memory space. As previously stated, the code ROM and RAM are used to store program code while the shared RAM 166 is used to store data. This memory architecture is micro-controller independent, that is, any micro-controller, regardless of its type, is generally compatible in design with the preferred memory architecture. The preferred 8051-based microcontroller architecture has a Harvard architecture wherein the address bus 174 and the data bus 182 are separate.

Generally, the X-51 Harvard-architecture designs such as the 8051 are capable of implementing instructions to "move code" ("movc"), or "move data" ("imov") due to the separation of the code and data spaces. The illustrated architecture supports three types of "move" instructions: "mov" to move data information to and from data RAM 162; "mov" to move program information to and from code RAM 164; and "mov" to move data information to and from shared RAM 166. As suggested above, the memory space assigned to each physical block of memory is such that the code ROM 156 is overlaid by the code RAM 164, and the code RAM 164 is contiguous with shared RAM 166. All "movx" instructions for the 8051-processor-compatible architecture are decoded to access any one of the 64K byte storage spaces within shared RAM 166. In alternative embodiments, less than 64K bytes of shared RAM may be used within microcontroller 69, in which case addresses exceeding the on-board shared memory space are presented to external data RAM shown in FIG. 7, i.e., external to the micro-controller chip 69. Similarly, all "movc" instructions must be decoded to access either code ROM 156 or code RAM 164 to allow program firmware (or code) to run from either memory.

Illustrated in FIG. 4, P0–P3 (186–192), are drivers/buffers for sourcing and sinking data to/from the address, data and interrupt busses, 146, 144, 152. In actuality, P0–P3 are special function registers shown separate from register 160 for the purpose of emphasizing their direct connection to the I/O pins (not shown) which are located on the ISDN controller chip 69. These I/O pins provide the first physical contact with the address, data and interrupt busses 146, 144 and 152, respectively applied to the ISDN controller chip.

The program counter 178 stores the address of the next program instruction to be executed in its program counter high (PCH) and program counter low (PCL) registers, where PCH stores the 8 most significant bits of the instruction address and PCL stores the 8 least significant bits of the instruction address. It is appreciated by those skilled in the art that while the processor architecture, resembling that of the 8051, is implemented to support 16-bit address instructions, 8-bits, 32-bits, 64-bits, and other bit-wide program addresses may be utilized. As such, PCH and PCL may be larger or smaller in size to accommodate the instruction address size for storage therein. Program counter 178 increments counts up or increments by one to address the next instruction stored either in the code ROM 156 or code RAM 164 of the dual port RAM 134 through bus 174.

The program instruction stored in PCH and PCL is presented to the control engine 176 for interpretation and decoding. The control engine 176 after decoding the instruction, provides the necessary timing and control signals that direct data flow throughout the microcontroller 69. Alternatively, program counter 178 may be loaded from the data bus 182 for example, when a branch program instruction is executed.

Through the data bus 182, data may be either read from or written into the code RAM 164, or program instruction data may be read from the code ROM 156. Similarly, user data may be read from or written in to the shared RAM 166. Address bus 174, generated by program counter 178, provides the address of the next program instruction to be fetched, to either the code ROM 156 or the code RAM 164. There is additionally a 16-bit data pointer register (Dptr) (not shown), which resides in the special function register 160 and is capable of using the address bus 174 to effect "move" instructions using the Dptr for data access.

The dual port RAM 134, may be accessed by either the processor 230 comprised of the logic and control engine 158, the special function register 160, and the data RAM 162, or the host processor (or CPU) in the computer 66 (in FIG. 3). In fact, the X-51 processor 230 and the host processor can read (or fetch) information either from the same or different addressed locations in the shared RAM 166 simultaneously. However, simultaneous access of the code RAM 164 by the X-51 processor and the host is not possible. Information can also be simultaneously written by the X-51 processor 230 and the host processor into different locations in shared RAM 166. But simultaneous writing of information into the same location of the shared RAM 166 by the X-51 processor and the host processor cannot be effectively performed because such simultaneous writing causes the data (stored in the RAM location being written to) to become unknown and thereby corrupt. To prevent or inhibit simultaneous writing of information by the X-51 processor and the host processor into the same location of the shared RAM 166, a comparator 170 is employed for comparing the address provided by bus 174 with the address from the host processor 72 qualified by "write" signals provided by both. That is, if the "write" signals are coincident to the same location of the shared RAM 166 a "wait" signal 172 is generated to the host processor to prevent its access to memory until the X-51 processor has finished writing. After the completion of the write cycle by the X-51 processor, computer 66 overwrites the data that was written by the X-51 processor in the same location. The net result is that the information stored in the same location by the X-51 processor is obliterated and replaced by the information provided by the written into the same location by the computer 66. Most well-designed software programs such as the software drivers residing in the host and the drivers in the X-51 processor, address this problem and prevent it from occurring through the use of appropriate protocol mechanisms; however, should this problem occur, the result is well defined such that the computer wins by virtue of the dual port RAM maintaining information provided by the computer rather than the X-51 processor.

The reason for making the computer 66, rather than the X-51 processor, wait during simultaneous write operations of the same location of memory, is in part due to the limitation of the 8051-based design of the X-51 processor 230 in lacking a "wait"-type signal while most host processors are sophisticated enough to support memory bus interfaces including wait cycles.

The last two address locations of the shared RAM 166 (within the dual port RAM 134) are reserved for generating interrupts for protocol purposes between the computer 66 and the X-51 processor when written thereto.

Figure 5:
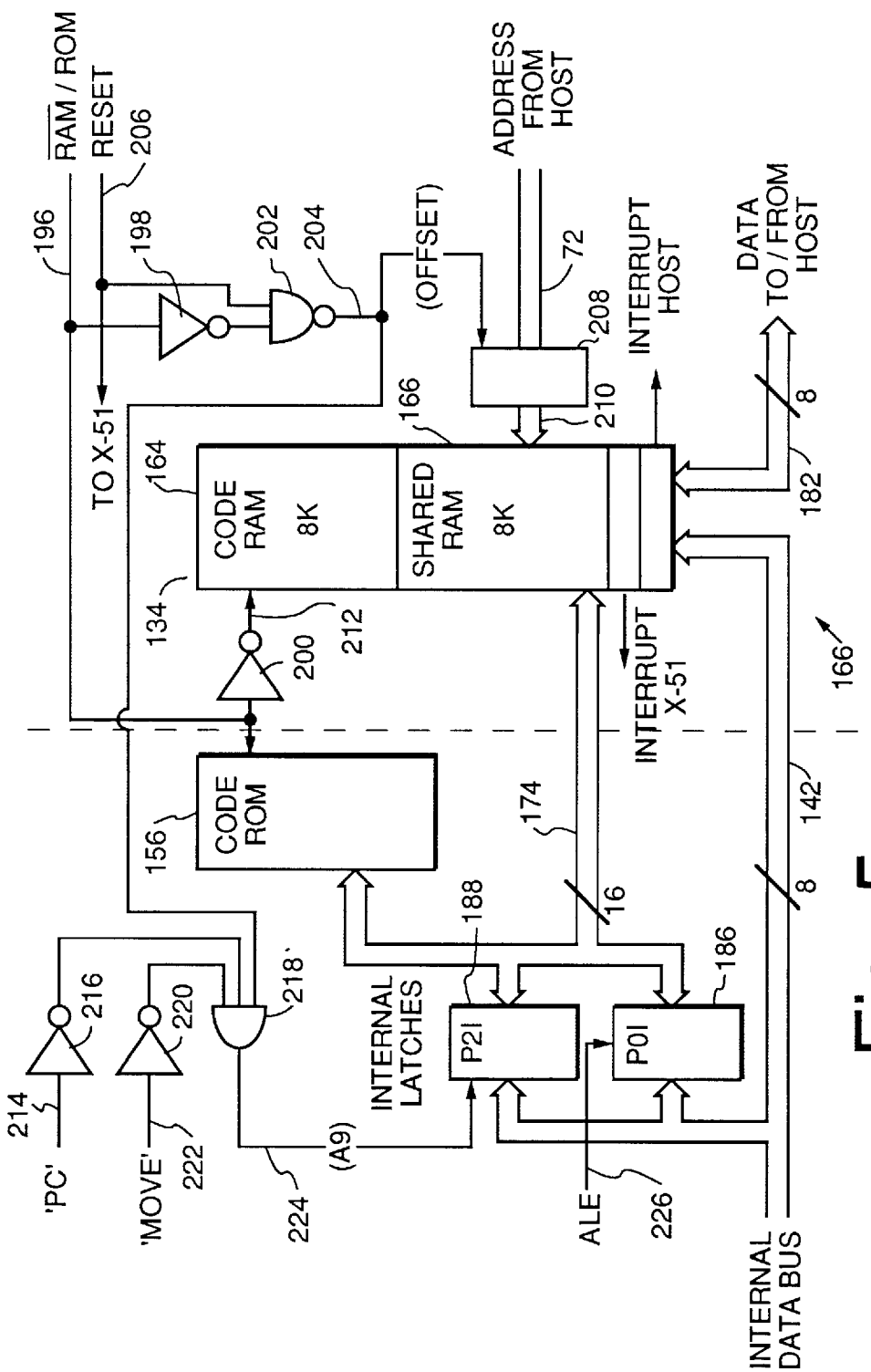
FIGS. 5, 6a, 6b and 7 illustrate further details of the microcontroller of FIG. 4.

FIG. 5 presents a preferred implementation of the memory architecture of the present invention as incorporated in the microcontroller 69. While not shown in this figure, the program counter 178 (FIG. 4) generates program instruction addresses in the manner described previously, and provides the same to access either the code ROM 156 or code RAM 164, as determined by a signal or the ROM/RAM* select line 196. The ROM/RAM* line signal is generated externally to the ISDN controller 69 in either of two ways; either by the computer 66 or by its connection to a fixed voltage in which case its state is not programmably alterable. The ROM/RAM* line 196 is physically an input pin to the microcontroller chip. When the ROM/RAM* pin is at logic state 1, the code ROM 156 is addressed for retrieval of program instructions therefrom, and when the ROM/RAM* pin is at logic state 0, the code RAM 164 is accessed (or addressed) for retrieval of and/or storage of program instructions therefrom. It should be noted that selecting different sources for retrieving program code does not modify the instruction itself. In other words, an X-51 processor opcode (binary representation of instruction words) is not in any way modified whether it is retrieved from code ROM storage or code RAM storage locations.

Starting from the right side of FIG. 5, a ROM/RAM* signal on line 196 is provided to the input of inverters 198 and 200. The output of inverter 198 is shown to provide input to one of the inputs of the two-input NAND gate 202 which in turn generates offset signal 204. Reset signal 206 is illustrated to be applied to the second input of the NAND gate 202. Offset signal is provided as A9 with the address bus 138 (which includes addresses A0–A8 and A10–A15) to the latch 208. Latch 208 in turn, addresses the dual port RAM 134 through the address bus 210.

ROM/RAM* signal 196 is further applied to enable the code RAM 156. The output of the inverter 200 generates the enable signal 212 to the code RAM 164. Accordingly, when ROM/RAM* signal 196 is set to logic state 1, the code ROM 156 is enabled (or accessed) and when it is set to logic state 0, the code RAM 164 is accessed.

In the left-hand side of FIG. 5, a PC signal 214 is introduced providing input to inverter 216, and the output of the inverter 216 is coupled to provide input to the three-input AND gate 218. AND gate 218 receives its second input from the output of inverter 220 and a third input from offset signal 204. Inverter 220 is shown to receive its input from "movc" signal 222.

AND gate 218 is shown to provide output 224 (or A9) to P2 188, which receives inputs from the data bus 142. P0 186 also receives input from bus 142 and temporarily stores the least significant bits on the data bus 142 to be provided to code ROM 156 or to code RAM 164 and which become the least significant bits on the address bus 174. The P2 188 latch provides temporary storage location for the most significant bits of the data bus 142, which become the most significant bits of the address bus 174 for input to code ROM 156 or code RAM 164. The low address bits are latched into P0 186 from the data bus 142. P0 186 is then used to read or write data from/to shared RAM 166 via the data bus 142.

Prior to the integration of the dual port RAM 134 with the X-51 processor 230 on a single chip, storage of the program code in the code ROM and storage of data in the shared RAM started at physical address 0000 and extended to the maximum physical address space defined by the size of the respective memories (in part defined by the number of bits in their address bus), i.e., the ISDN*tek CyberSpace Freedom series products, the code ROM extends from address 0 to address 1FFF (hex) while the shared RAM addresses extend from 0 to 7FF.

Since the present invention integrates the dual port RAM and the X-51 processor onto the same chip, it is impractical to allow both code memory (either code ROM 156 or code RAM 164) and data memory, i.e. shared RAM 166, to begin at address location 0. Therefore, either the code address space or the data address space must be offset from one another so as to avoid erroneous addressing of these two memory storage locations. Furthermore, while these address memory spaces are not required to be contiguous, the preferred embodiment maps the code ROM memory space contiguous with the shared RAM memory space. For the purpose of maintaining simplicity, the preferred embodiment will be described to map the program code (or program instructions) starting from address location 0, and the data will be stored at an address that is offset from location 0 in shared memory. Therefore, shared RAM memory space starts from an address equal to an offset plus 0.

In an alternative embodiment, shared RAM memory space starts at address 0, and program address space starts from a predetermined offset address value plus 0. As indicated, the remaining portion of this discussion will assume the former, that is, program address starts from address 0 and shared RAM starts from address offset.

Much effort has been spent in the past by the software developers in designing program code and developing firmware and driver software to be executed by the (host) computer 66 (in FIG. 3). Therefore, it is very much desirable to preserve that code and to use it in implementing the preferred embodiment of the present invention. The software that is executed by the computer has been written to expect the data being stored in the shared RAM 166 to exist in address space beginning at location 0. The investment in developing software code for the computer is preserved in the preferred embodiment by translating all of the shared memory addresses to an appropriate address space starting from an offset address as indicated above. This offset addressing is implemented by setting the tenth address bit (A9) of the 16-bit address bus 72 (A0 . . . A15) to logic state 1. Thus, the shared RAM is accessed only when A9 is set equal to 1 and in FIG. 5, A9 is set to 1 only when the offset signal 204 is set to logic state 1. Alternatively, other implementations using a different value as the offset are also possible. Offset selection principles are, indeed, independent of implementation in the sense that two separate address spaces beginning at zero are combined into a single integrated memory in accordance with the present invention, thereby requiring that one address space (the shared RAM address) be offset from the other. It should be noted that this concept holds true regarding implementations of the preferred embodiment using different processors. That is, the determination and implementation of the offset value is independent of the way in which the X-51 processor or other processors (whether they are 8051-based on otherwise) are utilized and implemented. Therefore, if the 8051-based processor of the preferred embodiment was to be replaced with another processor architecture, the features of the present invention would require a separation of code space (stored in code RAM or code ROM) and shared data space (stored in shared RAM), which is generally achievable via an offset mechanism of the type described herein.

Figure 6:
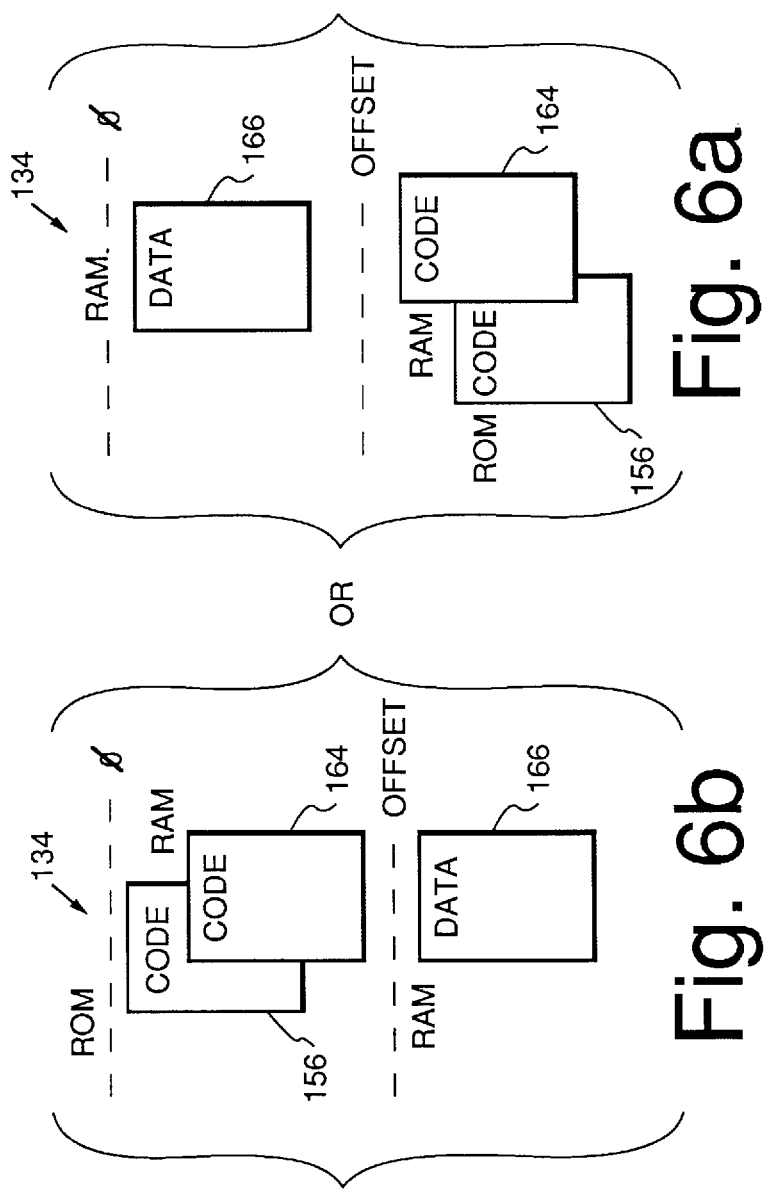

In the preferred embodiment, using A9 to implement the offset addressing, the computer (or host) access as well as the X-51 processor access to the shared RAM 166 (in FIGS. 6 and 7) require that addresses provided to the shared RAM be offset by the hexadecimal value 2000. This is true regardless of whether the code ROM or the code RAM is selected to store program code.

Figure 7:
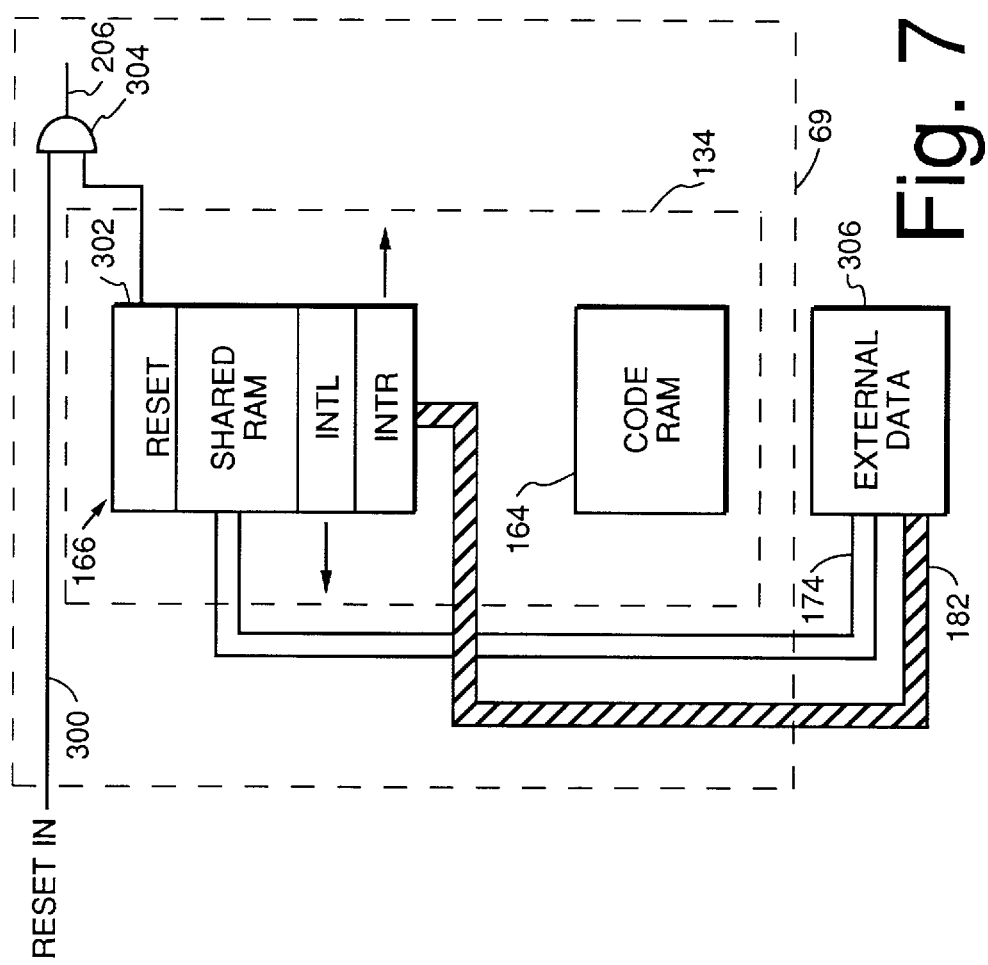

The size of the shared RAM 166 in the preferred embodiment shown in FIG. 5 is 8K bytes although other sizes of RAM may be employed. In fact, if more memory then the shared RAM's capacity is necessary, additional memory may be employed off-chip, i.e., such memory residing external to the microcontroller chip 69. In the latter situation, there will be address spaces accessed that are beyond the number of address lines presented to shared RAM 166. To address these higher addresses, address lines are presented to externally-located RAM through the P2 and P0 latches 188 and 186 such that the high byte of the address goes through P2 latch 188 and the low byte of the address goes through the P2 latch 186. FIG. 7 shows a preferred embodiment of the present invention using an external memory device 306, which receives address bus 174 for addressing additional memory and further receives data bus 182.

FIG. 7 further shows details of how the reset signal 206 is generated. Reset signal 206 is developed by AND gate 304, which receives two inputs, one being Reset-in 300, provided to microcontroller 69 and another being the output of reset register 302. If either of these two signals are activated (logic state '0' is the preferred activation state for these two signals although other polarities may be used), reset signal 206 is asserted.

As earlier noted, location '0000' in shared RAM 166 is overlayed by a reset storage location (such as a register) 302 for programmably generating reset signal 206. Therefore, writing to location '0000' in shared RAM 166 or asserting Reset_in signal 300 may cause reset signal 206 to be generated.

Referring back to FIG. 5, next, consideration is given as to how to resolve the contention existing between the X-51 processor wishing to write to the same memory location as the computer. While handshake mechanisms to allow the computer 66 and the X-51 processor 230 (FIG. 4) to coordinate access to the code RAM 164 may be devised, unnecessary complications arise in doing so. Instead, this problem is addressed in hardware where the reset signal 206 is utilized to defeat the offset signal 204. That is, when the reset signal 206 is asserted, the offset signal 204 is forced to logic state "0" because the output of NAND gate 202 will be at logic state zero thereby allowing the computer 66 to access the code RAM 164 beginning at address 0. As such, there will be no conflict and the X-51 will be held in reset condition where no program or code will be executed from the code RAM by the X-51 processor. Additionally, the computer 66 normally initializes the shared RAM while the X-51 processor is held in reset. It is an important part of this invention to preserve this behavior in order to avoid any changes to the software code in the computer. It is for these reasons that the reset signal 206 in FIG. 5 is qualified with the ROM/RAM* signal 196.

If code ROM 156 is to be selected for storing firmware code and executing firmware therefrom, the ROM/RAM* signal 196 is set to logic state 1 and the offset signal 204 becomes 1, and the computer 66 may then access the shared RAM 166 while the X-51 processor is reset (or inactive). If code RAM 164, rather than code ROM 156, is selected to maintain program firmware, then the ROM/RAM* signal 196 is set to logic state 0 and the offset signal 204 becomes 0, thereby allowing the computer 66 to access code RAM 164 while the X-51 processor is in reset state. Thus, by suitable control of the ROM/RAM* signal, the computer 66 can access both code RAM and shared RAM while the X-51 processor is held in reset state.

The reset signal 206 is generated external to the microcontroller 69 and is provided through one of the input pins of the chip. More specifically, the reset signal 206 is generated by the computer 66 during a system hardware reset such as when a PC user depresses the reset button on the PC, or when the PC is turned ON. The reset signal 206 is alternatively generated when the first address of the dual port RAM (in the preferred embodiment, address 0000) is addressed. For example, when address 0000 of the dual port RAM 134 is being accessed by the computer 66 for the purpose of writing data, the data is written to a register and to the dual port RAM 134 simultaneously, and one of the data bits being written indicates whether the X-51 processor 230 should be reset dependent upon the logic state of the bit. If so indicated, the X-51 processor is accordingly reset. During reset generated by either alternative, reset signal 206 is activated and in the preferred embodiment is set to logic state 1.

When the X-51 processor is released from reset, it attempts to fetch a program instruction from location 0 of either code ROM or code RAM (depending on which is being selected) and begins execution of the program instructions therefrom. If code ROM 156 is selected, i.e. ROM/RAM* signal 196=1, then the function performed by the microcontroller 69 will be dictated by the instruction placed in location 0 of the code ROM while the X-51 processor was in reset state. On the other hand, if code RAM 164 is selected, then the behavior and function of the microcontroller will be dictated by the instruction placed in location 0 of the code RAM while the X-51 processor was in reset state. The effect of this is that a "shadow" personality for the X-51 processor within the microcontroller is created when the X-51 is in reset state and released with ROM/RAM* set to logic state 1. It should be noted that the X-51 processor is a completely general purpose processor that is capable of executing any appropriate code stored in code RAM 164 if the ROM/RAM* is equal to 0 and the reset signal 206 is unasserted.

Before engaging in a discussion regarding the circuitry shown on the left-hand side of FIG. 5, it is important to have a general understanding of the addressing scheme of the X-51 processor, which is based upon the addressing scheme of the 8051 processor. These general addressing schemes also apply to all processors which recognize different memory spaces. The 8051 processor's addressing scheme is as follows:

TABLE 1

| Implementation | Memory Space | Opcode(s) |
| --- | --- | --- |
| 'mov' | Data RAM | |
| 'movc' (code fetch and @PC) | Code RAM | 0 × 83 movc A, @A + PC<br>0 × 93 movc A, @A + Dptr |
| 'movx' | Shared RAM | |

As shown above, all "mov" instructions access the internal data RAM 162 (shown in FIG. 4), all "movc" instructions and all instruction fetch cycles (@PC) access the code RAM 164 or code ROM 156. Thus, the offset address must be a condition to all memory accesses except those to code RAM 164 which are the "movc" instructions and instruction fetches. For access to the code RAM 164, the offset signal 204 is defeated as shown in FIG. 5. Where the instruction that is to be executed is a "movc" instruction, the "movc" signal 222 will be at a logic state of 1, thereby forcing the output of the inverter 220 to be 0. Any inputs of the gate 218 that are at logic state 0 drive the output of the gate 218 to a low, or 0, logic state. Similarly, when an instruction fetch occurs, PC signal 214 which represents @PC in Table 1, will be at logic state 1 which will drive the output of the and gate 218 low. Thus, if either of PC signal 214 or "movc" signal 222 are high, or 1, the code RAM 164 will be accessed by the X-51 processor and addressed (as indicated in Table 1) by bus 174.

In FIG. 6a an alternative embodiment is shown wherein address locations starting from location 000 to a predetermined offset address value are allocated to shared RAM 166 wherein data is stored. Program code on the hand, is stored in either code RAM 164 or code ROM 156, which are assigned to address spaces starting from the offset address location.

FIG. 6b displays the dual port RAM 134 including the shared RAM 166 and code ROM and RAM, 156 and 164, wherein shared RAM memory locations are relative to address location zero, while code locations (156 or 164) are relative to the offset address.

It should be understood that the X-51 is designed to optimize the ISDN interface and control in terms of the number of chips and the "footprint" of each chip. Although the initial ROM contents manufactured into the device are intended for ISDN control, the present invention is not in any way limited in use to an ISDN interface. In fact, the code stored in ROM may be used for applications other than ISDN applications. Even in the preferred ISDN configuration presented herein, if the host computer loads non-ISDN code while the X-51 is reset, and the ROM/RAM* line causes the X-51 to execute from code RAM (as opposed to code ROM), when the X-51 is released from reset, it will execute the code stored in RAM, which may have nothing to do with an ISDN application. The host computer may, therefore, re-define the operation of the X-51 in any given application and can even completely ignore the "shadow" ROM effect as discussed above.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A microcontroller integrated circuit for connecting a computer system having a host processor to an ISDN interface to accommodate data transfer over an ISDN network, comprising:
    a local processor; and
    a dual port RAM addressable by the host processor and said local processor and having a predetermined first memory space for storing program code and a predetermined second memory space for storing data,
    whereby the host processor and said local processor can simultaneously access said second memory space and the host processor can further access said first and second memory spaces when it resets said local processor while said local processor is in reset and when said local processor is not in reset, said local processor can access said first and second memory spaces.

2. A microcontroller integrated circuit as recited in claim 1 wherein said local processor further includes a reset input terminal responsive to a reset signal from the host processor for resetting said local processor when said reset signal is in an active state and for releasing said local processor from reset when said reset signal is not in an active state.

3. A microcontroller integrated circuit as recited in claim 2 wherein the host processor is prevented from accessing said first memory space when said reset signal is not activated.

4. A microcontroller integrated circuit as recited in claim 1 wherein said second memory space of said dual port RAM further includes a local control register responsive to a predetermined value provided by the host processor for resetting said local processor when said predetermined value is received by said local control register and for releasing said local register from reset when the host processor provides a value other than the predetermined value to said local control register.

5. A microcontroller integrated circuit as recited in claim 4 wherein the host processor is prevented from accessing said first memory space during the period in which said local processor is reset.

6. A microcontroller integrated circuit as recited in claim 1 further including a program ROM coupled between the host processor and said local processor for alternatively storing program code wherein while said local processor is in reset the host processor selectably stores program code in a group consisting of said dual port RAM and said program ROM depending upon the state of a ROM/RAM* signal applied to said local processor.

7. A microcontroller integrated circuit as recited in claim 6 wherein said ROM/RAM* signal is programmed by the host processor.

8. A microcontroller integrated circuit as recited in claim 7 wherein said ROM/RAM* signal is a constant value indicating the selection of said program ROM.

9. A microcontroller integrated circuit as recited in claim 6 wherein said local processor executes program code from a group consisting of said dual port RAM and said program ROM depending upon the state of said ROM/RAM* signal.

10. A microcontroller integrated circuit as recited in claim 1 wherein said local processor further includes an internal data RAM for storing data, said internal data RAM accessible only by said local processor.

11. A microcontroller integrated circuit as recited in claim 1 further including an external data RAM coupled externally to the microcontroller integrated circuit through local processor signals generated by the local processor for storing data in said external RAM when the maximum addressable location of said dual port RAM is exceeded.

12. A microcontroller for facilitating transfer of digital information from a host processor through a communication channel, comprising:

a local processor;

a program ROM having storage locations addressable by said local processor, said program ROM for storing program code;

a dual port RAM having storage locations addressable by the host processor and said local processor and having a predetermined storage area for storing data, said data storage area being simultaneously accessible by the local processor and the host processor, whereby the host processor and said local processor can simultaneously access said data storage area and the host processor can further access said program storage area and said data storage when said local processor is in reset, and when said local processor is not in reset, said local processor can access said data storage space and said program storage space.

13. A microcontroller as recited in claim 12 wherein said ROM and RAM are addressed by the host through host address signals, host data signals, host bus control signal, and host interrupt signals.

14. A microcontroller as recited in claim 12 wherein said local processor is operative to generate local processor address signals for addressing the storage locations within said ROM and said RAM.

15. A microcontroller as recited in claim 14 and further including a comparator circuit responsive to said host address signals and said local processor address signals for comparing said host address signals to said local processor address signals, said comparator circuit operative to generate a wait signal for use by the host processor, wherein when said local address signals and said host address signals are the same, the wait signal is activated causing the host processor to wait for accessing said RAM, and when the local processor address signals and the host address signals are not the same, the wait signal is deactivated, allowing the host processor to freely access the RAM.

16. A microcontroller as recited in claim 15 further including an external memory coupled externally to the local processor and responsive to said local processor address signals for storing binary data when said local processor address exceeds a maximum internal data address.

17. A microcontroller as recited in claim 16 wherein the local processor includes an ALU circuit responsive to local processor data signals and operative to generate an ALU output signals, a special function register circuit responsive to said ALU output signals and operative to generate output program counter signals, a program counter circuit responsive to said output program counter signals and to said local processor data signals and operative to generate next local processor data signals, and a control circuit responsive to said next local processor data signals and operative to generate a plurality of control signals for use by the local processor, wherein program code having a series of program instructions is executed from either of said ROM or RAM with the order of execution of the program instructions being defined by said program counter under the direction of said control circuit to configure said ALU to process the local processor data signals.

* * * * *